May 1, 1962     W. W. WHITE     3,031,852
RADIATION TURBINE
Filed Feb. 6, 1958
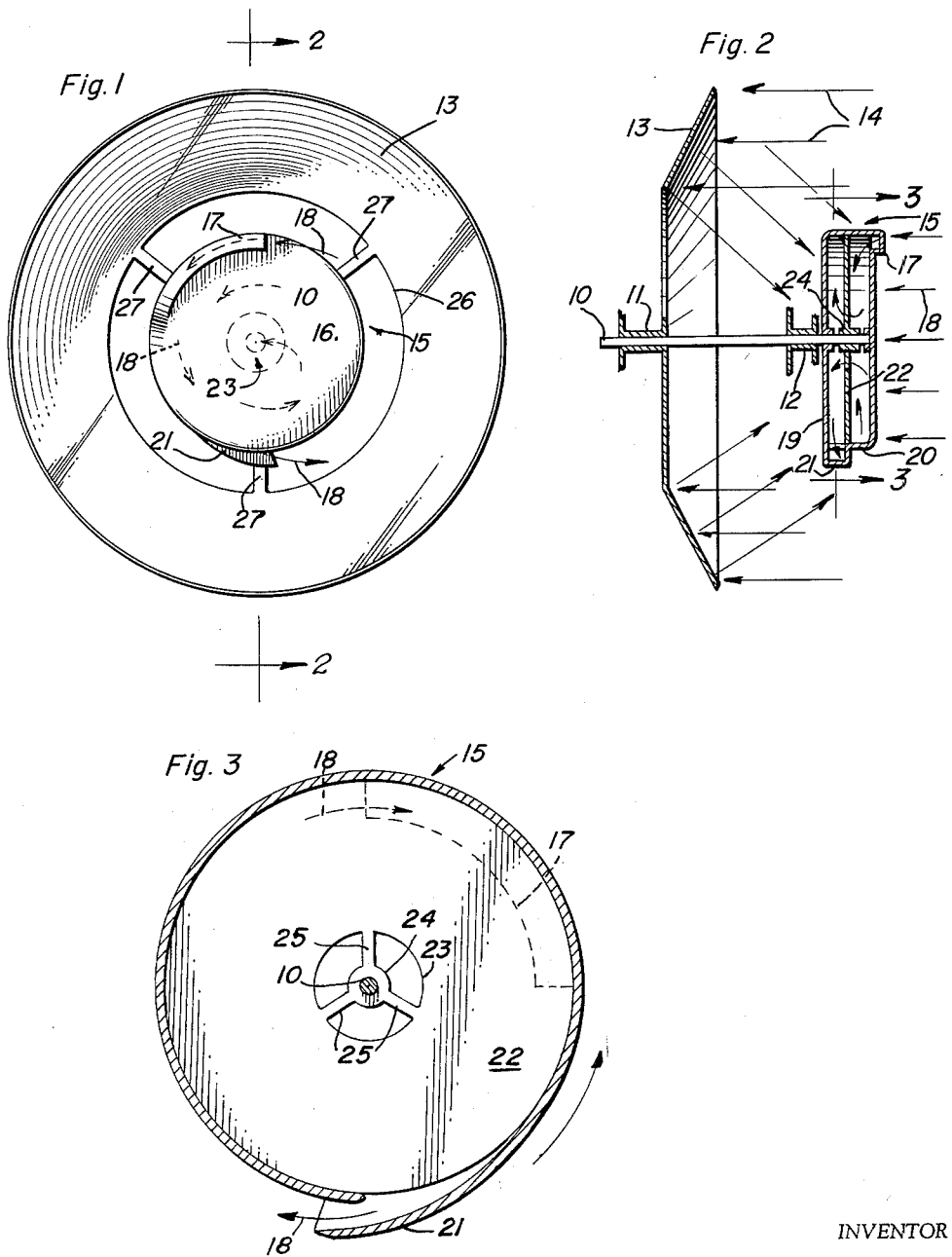
INVENTOR
Walter W. White

United States Patent Office 3,031,852
Patented May 1, 1962

3,031,852
RADIATION TURBINE
Walter W. White, 7408 16th St., Rio Linda, Calif.
Filed Feb. 6, 1958, Ser. No. 714,010
3 Claims. (Cl. 60—59)

This invention relates to radiation turbines.

It is an object of the present invention to provide a radiation turbine which is operated by atmospheric and solar heat bearing radiation.

It is another object of the present invention to provide a radiation turbine of the above type which includes an expandible operating fluid which is heated by direct exposure to solar or atmospheric heat radiation and/or by contact with turbine parts that have been so heated.

Other objects of the invention are to provide a radiation turbine bearing the above objects in mind which is of simple construction, has a minimum number of parts, is inexpensive to manufacture and efficient in operation.

For other objects and for a better understanding of the invention, reference may be had to the following detailed description taken in connection with the accompanying drawings, in which:

FIGURE 1 is a front elevational view of an embodiment of the present invention;

FIG. 2 is a longitudinal sectional view thereof taken along the line 2—2 of FIG. 1; and FIG. 3 is a transverse sectional view taken along the line 3—3 of FIG. 2.

Referring now more in detail to the drawing, and more particularly to FIGS. 1, 2 and 3, 10 represents a shaft rotatably mounted between the bearing members 11 and 12, the latter being suitably mounted. A hollow, frusto-conical reflector 13 is fixedly mounted on the inner end of the bearing member 11 and is adapted to reflect the solar or atmospheric heat radiation 14 toward the axis of rotation and beyond the bearing member 12.

A hollow cylindrical turbine indicated generally at 15 is fixedly mounted on the extended end of the shaft 10 outwardly of bearing 12 and is provided on the outer circular wall 16 thereof with the arcuate air inlet 17 adapted to permit the passage therethrough of the air 18. The turbine 15 also includes the inner circular wall 19 and the hollow cylindrical peripheral wall 20 which is formed with the arcuate air outlet 21 (FIG. 3). The inlet 17 and the outlet 21 are of similar shape and may extend outwardly from the turbine either in a radial direction or an axial directon and upon rotation of the turbine in the direction of the arrow of FIG. 3 the air will be forced inwardly through the inlet 17 and ejected outwardly through the outlet 21, as will be obvious.

According to one construction, the circular wall 19 is transparent and is adapted to pass the heat radiation 14 inwardly therethrough into contact with the inner opaque circular plate 22. The inner wall 22 (FIG. 3) is provided with a central circular opening 23 which receives therethrough the shaft 10, the plate 22 being connected to the hub 24 fixedly mounted on the shaft 10 by means of the braces 25 whereby to mount the plate on the hub while at the same time permitting the passage of air 18 through the opening 23.

As shown in FIG. 1, the reflector 13, is supported on the stationary member 11 by means of the radially spaced braces 27, or by other suitable means.

In operation, the heat radiation 14, either direct, refracted through lenses or reflected from the reflector 13, shines on the turbine 15 which is constructed to operate as an aero-thermo-dynamic duct or "ram jet," revolving around the shaft 10. The radiation 14 passes through the exterior turbine wall 19 and then is absorbed by the interior opaque wall 22. The air 18, or any other gas, inside of the turbine 15 is heated through contact with the surfaces 22 and is thereby expanded, increasing the static pressure of the air 18 within the turbine. The total area of the cross section of the inlet or inlets 17 is made to be less than the total cross sectional area of the outlets 21. Therefore, the loss of internal static gas pressure at the inlet opening 17 is lost to a smaller pressure area at the inlet than it is at the exhaust 21. Therefore, a net force in the direction of the inlet openings result from the generation of pressure within the turbine. This resultant force, which rotates the turbine, is usable power and also serves to replace the gas lost through the exhaust 21, simultaneously maintaining the working static pressure inside the turbine due to the ramming effect of the gas at the inlet 17 when the turbine is in motion. The available power may be taken off of the shaft 10 in any suitable manner.

Instead of having the exterior wall 19 transparent, the outer wall may be opaque, in which case the air 18 would receive thermal energy from the wall 19 instead of the inner wall 22, with the same net result.

A plurality of turbines 15 may be mounted on a single shaft 10 to impart greater power thereto. Also, instead of a single inlet and outlet opening, a plurality of such openings may be provided, save only that the total cross sectional area of the combined exhaust openings is greater than the total area of the cross sections of the intake openings. A similar force differential can also be obtained by placing the exhaust openings a greater distance from the longitudinal axis of shaft 10 than the inlet openings.

While various changes may be made in the detail construction, and the basic parts may be used in various other combinations, it shall be understood that such changes shall be within the spirit and scope of the present invention as defined by the appended claims.

It is expected that the efficiency of each of the turbines thus described will be greatly increased when they are used in the outer atmosphere or in space because of the extreme low temperatures.

What I claim as new and desire to protect by Letters Patent of the United States is:

1. A turbine adapted to be driven by a source of radiant heat comprising a rotatable shaft, a hollow rotor mounted on the shaft and enclosing a heating chamber, a plate mounted on the rotor to extend transverse to the shaft inwardly from the periphery of the rotor and divide the chamber into a first compartment and a second compartment, the plate having an opening in its central portion to provide communication between the two compartments, the rotor including inlet means for the first compartment and outlet means for the second compartment, the outlet means being spaced from the shaft beyond the opening in the plate and opening tangentially in one direction with respect to the direction of rotor rotation, and the inlet means being spaced from the shaft beyond the opening in the plate and opening tangentially in the other direction with respect to the direction of rotor rotation, the cross sectional area of the outlet means being greater than the cross sectional area of the inlet means, the hollow rotor having a portion transparent to the radiant heat and means for concentrating and directing radiant heat through the transparent portion and onto the plate in the heating chamber.

2. Apparatus according to claim 1 in which the plate is opaque to radiant heat.

3. Apparatus according to claim 1 in which the outlet means is spaced farther from the shaft than the inlet means.

(References on following page)

References Cited in the file of this patent

UNITED STATES PATENTS

| | | |
|---|---|---|
| 1,424,932 | Moreau | Aug. 8, 1922 |
| 1,700,675 | Goddard | Jan. 29, 1929 |
| 2,379,541 | Planiol | July 3, 1945 |
| 2,644,301 | Karlby | July 7, 1953 |
| 2,696,078 | Waitzman | Dec. 7, 1954 |
| 2,896,408 | O'Connell | July 28, 1959 |
| 2,917,443 | Grebe | Dec. 15, 1959 |

FOREIGN PATENTS

| | | |
|---|---|---|
| 598,774 | Great Britain | Feb. 26, 1948 |